US011175742B2

(12) United States Patent
Fan et al.

(10) Patent No.: US 11,175,742 B2
(45) Date of Patent: *Nov. 16, 2021

(54) MEDIA SHARING WITH VISUALIZED POSITIONING LAYOUT IN REAL TIME

(71) Applicant: International Business Machines Corporation, Armonk, NY (US)

(72) Inventors: Si Bin Fan, Beijing (CN); Su Liu, Austin, TX (US); Yuan Yuan Wang, Beijing (CN); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/673,003

(22) Filed: Nov. 4, 2019

(65) Prior Publication Data

US 2020/0064925 A1 Feb. 27, 2020

Related U.S. Application Data

(63) Continuation of application No. 15/801,446, filed on Nov. 2, 2017, now Pat. No. 10,551,933.

(51) Int. Cl.
*G06F 3/01* (2006.01)
*G06F 3/0488* (2013.01)
(Continued)

(52) U.S. Cl.
CPC ............ *G06F 3/017* (2013.01); *G01S 5/0289* (2013.01); *G06F 1/1694* (2013.01);
(Continued)

(58) Field of Classification Search
CPC .... G06F 3/017; G06F 1/1694; G06F 3/04883; H04M 1/72412; H04M 2250/64; G01S 5/0289; H04B 5/0031
See application file for complete search history.

(56) References Cited

U.S. PATENT DOCUMENTS 8,464,184 B1 6/2013 Cook et al.
8,989,670 B2 3/2015 Kiveisha et al.
(Continued)

OTHER PUBLICATIONS

Appendix P, "List of IBM Patents or Patent Applications Treated as Related", Mar. 26, 2020, 2 pages.
(Continued)

*Primary Examiner* — Qun Shen
(74) *Attorney, Agent, or Firm* — William H. Hartwell; Maxine L. Barasch; Keohane & D'Alessandro, PLLC (57) ABSTRACT

Disclosed embodiments provide techniques for intelligent media sharing with visualized positioning layout in real time. A floor plan is retrieved corresponding to the physical location of a sender electronic device. A zone boundary corresponding to the physical location of the sender electronic device is determined. A list of potential recipient electronic devices within the zone boundary is generated. A floor plan view is rendered on the sender electronic device. A graphical representation of the potential recipient electronic devices on the floor plan view is rendered, overlaid in a semi-transparent manner with a media selection interface on the sender electronic device. A selection is received for one or more media items using the media selection interface. A send request is received for one or more potential recipients, resulting in sending the one or more media items to at least one potential recipient in response to receiving a user interface request action.

17 Claims, 9 Drawing Sheets

(51) Int. Cl.
  *G01S 5/02*  (2010.01)
  *G06F 1/16*  (2006.01)
  *H04M 1/72412*  (2021.01)
  *H04B 5/00*  (2006.01)
  *H04M 1/72457*  (2021.01)

(52) U.S. Cl.
  CPC .... *G06F 3/04883* (2013.01); *H04M 1/72412* (2021.01); *H04B 5/0031* (2013.01); *H04M 1/72457* (2021.01); *H04M 2250/64* (2013.01)

(56) References Cited

U.S. PATENT DOCUMENTS

| | | | |
|---|---|---|---|
| 9,055,404 | B2 | 6/2015 | Setlur et al. |
| 9,412,000 | B1 | 8/2016 | Ge et al. |
| 9,980,112 | B1* | 5/2018 | Newby ............... H04W 4/029 |
| 2012/0240077 | A1* | 9/2012 | Vaittinen ............. G06F 3/04815 715/781 |
| 2012/0296777 | A1 | 11/2012 | Fugman et al. |
| 2012/0329474 | A1* | 12/2012 | Seavey ............... G09B 29/007 455/456.1 |
| 2013/0006790 | A1 | 1/2013 | Raskin et al. |
| 2014/0087654 | A1* | 3/2014 | Kiveisha .............. H04B 5/0031 455/41.1 |
| 2015/0036016 | A1 | 2/2015 | Jovicic |
| 2015/0128067 | A1* | 5/2015 | Wong ..................... G06F 3/017 715/748 |
| 2016/0249241 | A1* | 8/2016 | Barmettler .......... G06F 3/04847 |
| 2016/0327293 | A1* | 11/2016 | Grabowski .............. F24F 11/30 |
| 2017/0061692 | A1 | 3/2017 | Giraldi et al. |
| 2017/0357917 | A1* | 12/2017 | Holmes ........... G06Q 10/06314 |
| 2019/0129507 | A1 | 5/2019 | Fan et al. |

OTHER PUBLICATIONS

Shen, Qun, U.S. Appl. No. 15/801,446, Office Action dated Jan. 8, 2019, 14 pgs.

Shen, Qun, U.S. Appl. No. 15/801,446, Final Office Action dated Apr. 1, 2019, 10 pgs.

Shen, Qun, U.S. Appl. No. 15/801,446, Notice of Allowance dated Sep. 26, 2019, 8 pgs.

* cited by examiner

MEDIA SHARING WITH VISUALIZED POSITIONING LAYOUT IN REAL TIME

The present patent document is a continuation of U.S. patent application Ser. No. 15/801,446, filed Nov. 2, 2017, entitled "MEDIA SHARING WITH VISUALIZED POSITIONING LAYOUT IN REAL TIME", the entire contents of which is incorporated herein by reference.

FIELD OF THE INVENTION

Embodiments of the invention relate to media sharing, and more particularly, to media sharing with visualized positioning layout in real time.

BACKGROUND

People use computing devices to capture and store multimedia items, including photos, videos, music, etc. It is common for a person to desire to share (i.e., send) an item of multimedia to another person's computing device for that person to see or hear. Conventional methods of sharing require a user to access his/her contact list in his/her user device to find the information of the person with whom she'd like to share regardless of whether the location of the recipient user device is near or far from the sender's. The process of sharing can be time consuming, onerous, and inefficient. There exists a need for improvements in media sharing.

SUMMARY

In one aspect, there is provided a computer-implemented method for media sharing, comprising: determining a physical location of a sender electronic device; retrieving a floor plan corresponding to the physical location of the sender electronic device; determining a zone boundary corresponding to the physical location of the sender electronic device; generating a list of potential recipient electronic devices within the zone boundary; rendering a floor plan view on the sender electronic device; rendering a graphical representation of the potential recipient electronic devices on the floor plan view; rendering a media selection interface on the sender electronic device; receiving a selection for one or more media items from the media selection interface; and sending the one or more media items to at least one potential recipient electronic device in response to receiving a user interface request action.

In another aspect, there is provided an electronic communication device comprising: a processor; a memory coupled to the processor, the memory containing instructions, that when executed by the processor, perform the steps of: determining a physical location of a sender electronic device; retrieving a floor plan corresponding to the physical location of the sender electronic device; determining a zone boundary corresponding to the physical location of the sender electronic device; generating a list of potential recipient electronic devices within the zone boundary; rendering a floor plan view on the sender electronic device; rendering a graphical representation of the potential recipient electronic devices on the floor plan view; rendering a media selection interface on the sender electronic device; receiving a selection for one or more media items from the media selection interface; and sending the one or more media items to at least one potential recipient electronic device in response to receiving a user interface request action.

In yet another aspect, there is provided a computer program product for media sharing, for an electronic computing device comprising a computer readable storage medium having program instructions embodied therewith, the program instructions executable by a processor to cause the electronic computing device to: determine a physical location of a sender electronic device; retrieve a floor plan corresponding to the physical location of the sender electronic device; determine a zone boundary corresponding to the physical location of the sender electronic device; generate a list of potential recipient electronic devices within the zone boundary; render a floor plan view on the sender electronic device; render a graphical representation of the potential recipient electronic devices on the floor plan view; render a media selection interface on the sender electronic device; receive a selection for one or more media items from the media selection interface; and send the one or more media items to at least one potential recipient electronic device in response to receiving a user interface request action.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for intelligent media sharing with visualized positioning layout in real time. A floor plan is retrieved corresponding to the physical location of a sender electronic device. A zone boundary corresponding to the physical location of the sender electronic device is determined. A list of potential recipient electronic devices within the zone boundary is generated. A floor plan view is rendered on the sender electronic device.

A graphical representation of the potential recipient electronic devices on the floor plan view is rendered, overlaid in a semi-transparent manner with a media selection interface on the sender electronic device. A selection is received for one or more media items using the media selection interface. A send request is received for one or more potential recipients, resulting in sending the one or more media items to at least one potential recipient in response to receiving a user interface request action.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Figure 1:
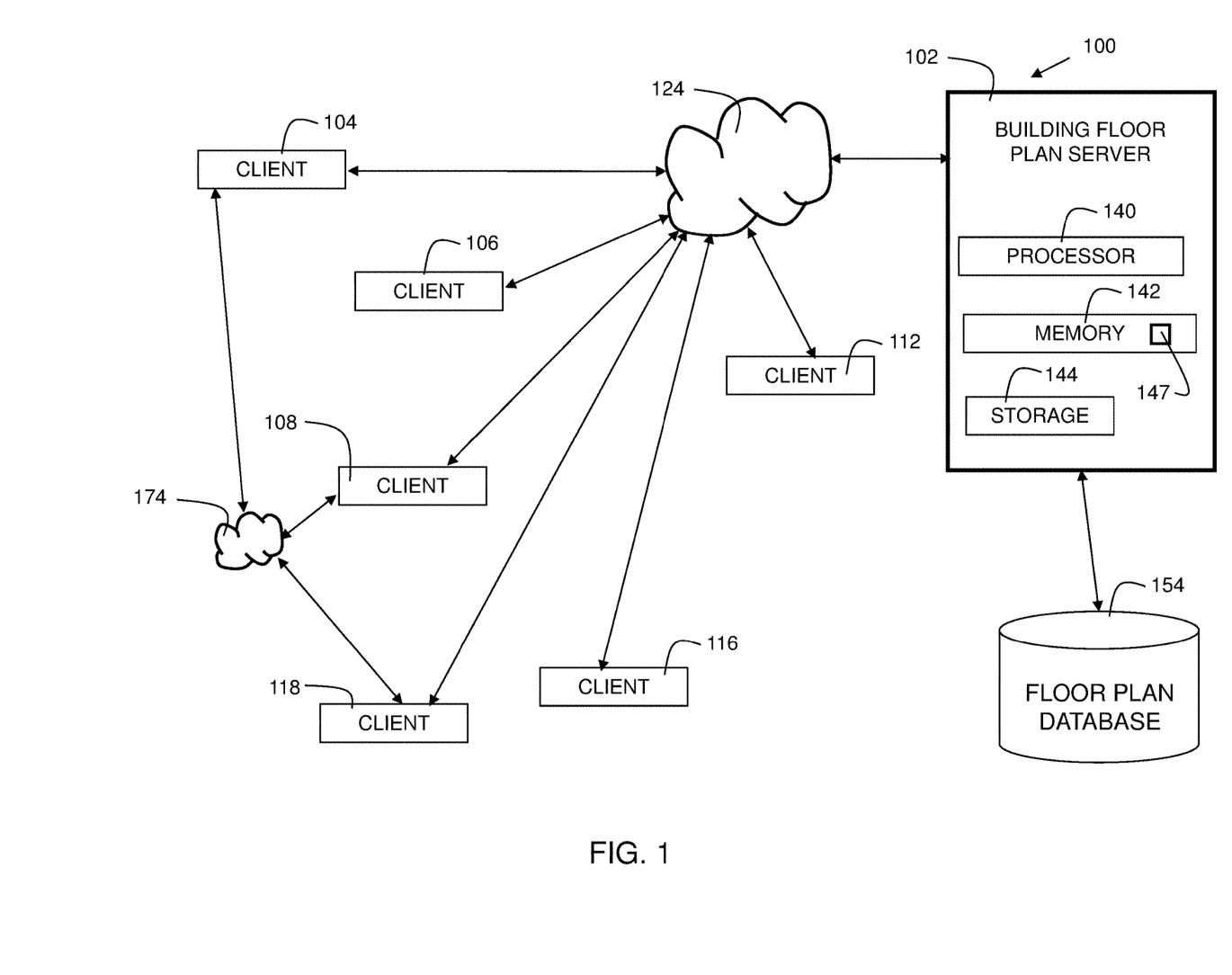
FIG. 1 is a system diagram illustrating embodiments of the present invention.

FIG. 1 is a system diagram 100 illustrating embodiments of the present invention. Building floor plan server 102 comprises processor 140, memory 142, and storage 144. Instructions 147 for executing embodiments of the present invention are shown stored in memory 142. Building floor plan server 102 is in communication with network 124 and floor plan database 154. In embodiments, network 124 may be the Internet, a wide area network (WAN), a local area network (LAN), a cloud network, or any other suitable network. Floor plan database 154 stores floor plan information for various buildings, outdoor spaces, etc. The floor plans can be compiled from people submitting electronic reports, crowdsourcing, government records, or any other suitable way. The floor plans are associated with geolocation data via GPS coordinates (latitude, longitude, and altitude), or other suitable geolocation measurements.

Diagram 100 shows client devices 104, 106, 108, 112, 116, and 118, which are in communication with network 124. In practice, each client device may be associated with a different user. Client devices 104, 108, and 118 are also shown also in communication with network 174, which may be an ad hoc network, a point to point network, or other suitable network. Client devices can be smartphones, tablet computers, laptop computers, desktop computers, a combination thereof, or other suitable device. This can be a local area network or other suitable network. Clients may utilize Wi-Fi Triangulation or other suitable method to determine their positions within a structure, those positions may be broadcast such that the sending device is aware of the position of the nearby devices. The detection of nearby devices may include using RSSI (received signal strength indication) from neighboring devices. The clients may also broadcast identifying information such as a unique identifier and/or user account information such as user names, profile pictures, account addresses, and/or other information.

Figure 2:
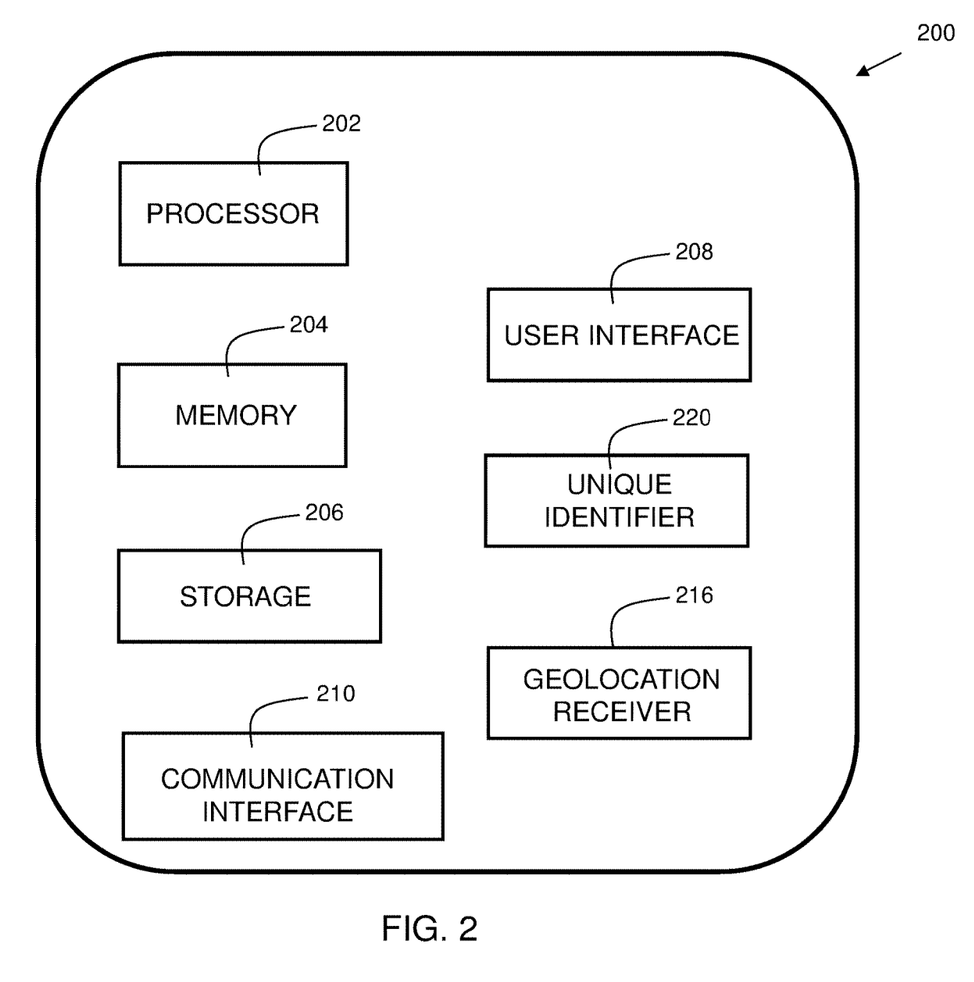
FIG. 2 is a block diagram of a client device used in embodiments of the present invention.

FIG. 2 is a block diagram of a client device 200 in accordance with embodiments of the present invention. Device 200 is shown as a simplified diagram of modules. Device 200 is an electronic computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se. Memory 204 includes instructions, which when executed by the processor, implement steps of the present invention. In embodiments, device 200 may have multiple processors 202, and/or multiple cores per processor.

Device 200 may further include storage 206. In embodiments, storage 206 may include one or more magnetic storage devices such as hard disk drives (HDDs). Storage 206 may include one or more solid state drives (SSDs). Any other storage device may be included instead of, or in addition to, those disclosed herein.

Device 200 further includes a user interface 208. In some embodiments, the user interface may include a display system, which may include one or more displays, examples of which include a liquid crystal display (LCD), a plasma display, a cathode ray tube (CRT) display, a light emitting diode (LED) display, an organic LED (OLED) display, or other suitable display technology. The user interface 208 may include a keyboard, mouse, and/or a touch screen, incorporating a capacitive or resistive touch screen in some embodiments.

Device 200 further includes a communication interface 210. In some embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network. Any communication interface, now known or hereafter developed, may be substituted.

Device 200 further includes a unique identifier 220. Unique Identifier 220 can be a hardware identifier stored in protected flash or other read-only memory, programmed at the factory. It can include a MAC address, serial number, Bluetooth address, or another suitable unique identifier. The unique identifier can be used in the determination of which devices are nearby.

Device 200 further includes a geolocation receiver 216. This can be for GPS, GLONASS, or another suitable geolocation system.

Figure 3:
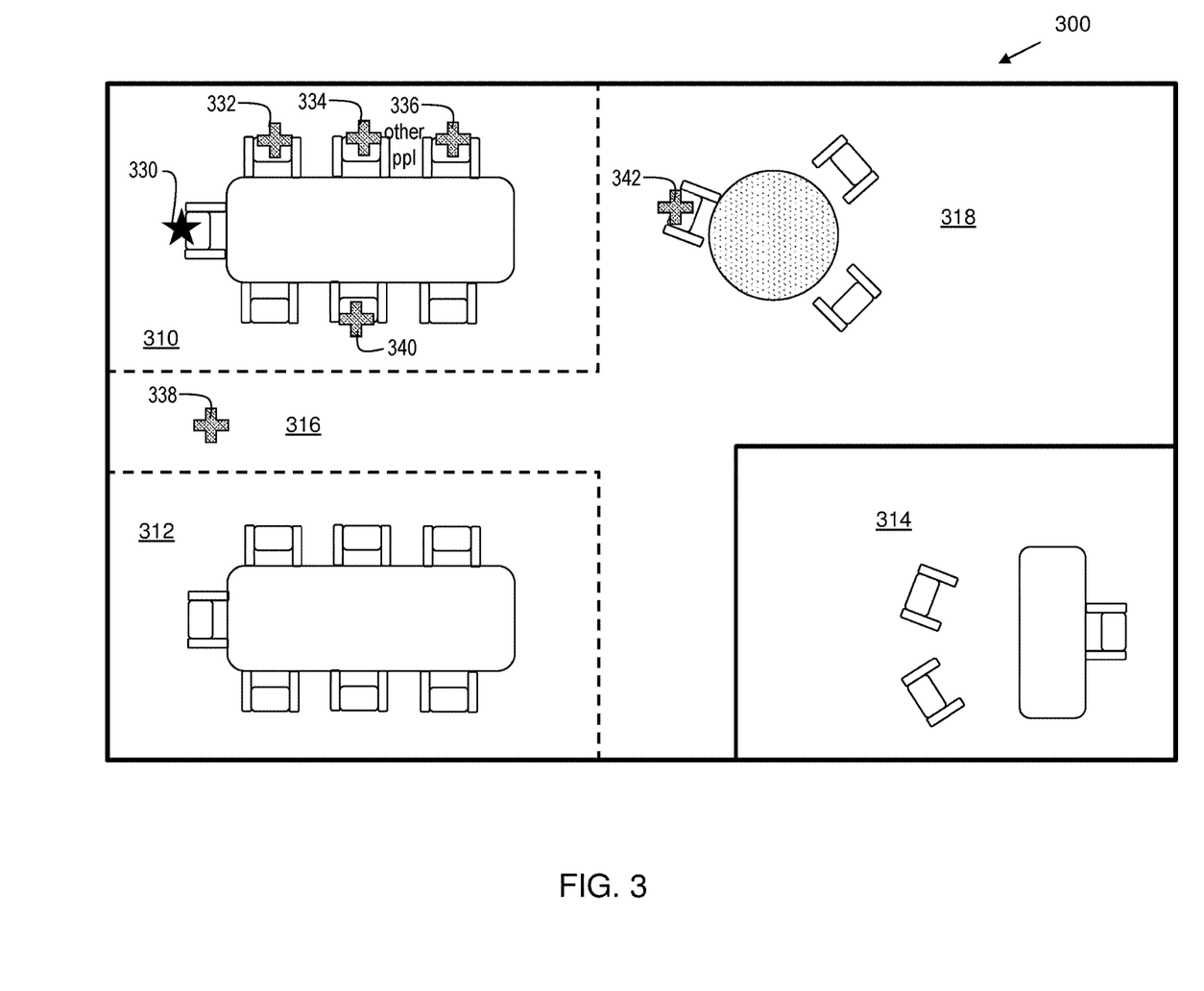
FIG. 3 shows exemplary floor plan data.

FIG. 3 shows exemplary floor plan data. Embodiments include determining a physical location of a sender electronic device, and retrieving a floor plan corresponding to the physical location of the sender electronic device. In the example, user 330 has the sender electronic device, and is positioned with the device at the head of the conference table in zone 312 shown in floor plan 300. Sender electronic device retrieves the floor plan from floor plan database 154 (of FIG. 1) and determines the exact location of the user via the geolocation receiver 216 (FIG. 2).

In embodiments, a zone boundary corresponding to the physical location of the sender electronic device is determined. In the example, it is determined that user 330 is in zone 310. Five different zones are shown on the floor plan: zone 310, zone 312, zone 314, zone 316, and zone 318. Zones 310 and 312 are conference areas. Zone 316 is a hall. Zone 318 is a lounge area. Zone 314 is an office area. Zone 314 is the only area enclosed on all sides with a wall. Zones 310 and 312 are only enclosed by walls on two sides, zone 316 includes only one wall, and zone 318 includes walls on only 3 sides. Accordingly, zones are determined by boundaries, which may not necessarily include walls.

In embodiments, a list is generated of potential recipient electronic devices that are within the zone boundary where the user is located. Embodiments include detecting the presence of a plurality of recipient electronic devices via a received signal strength indication, determining a position of each detected electronic device, and including the detected electronic device in the list of potential recipient electronic devices if the position of the detected electronic device is deemed to be within the zone boundary. User 330 has the sender electronic device. Other than the user, persons having electronic devices are in the area of floor plan 300. The sender electronic device detects the presence of recipient electronic devices of the other persons in the area. Persons 332, 334, 336, and 340 are at the conference table in zone 310 with user 330. Person 338 is in zone 316. Person 342 is at the table in zone 318. In the example of FIG. 3, each person has a corresponding electronic device suitable for receiving media content. In embodiments, an ad hoc network 174 (FIG. 1) is established between the sender electronic device and each electronic device from the list of potential recipient electronic devices.

Figure 4:
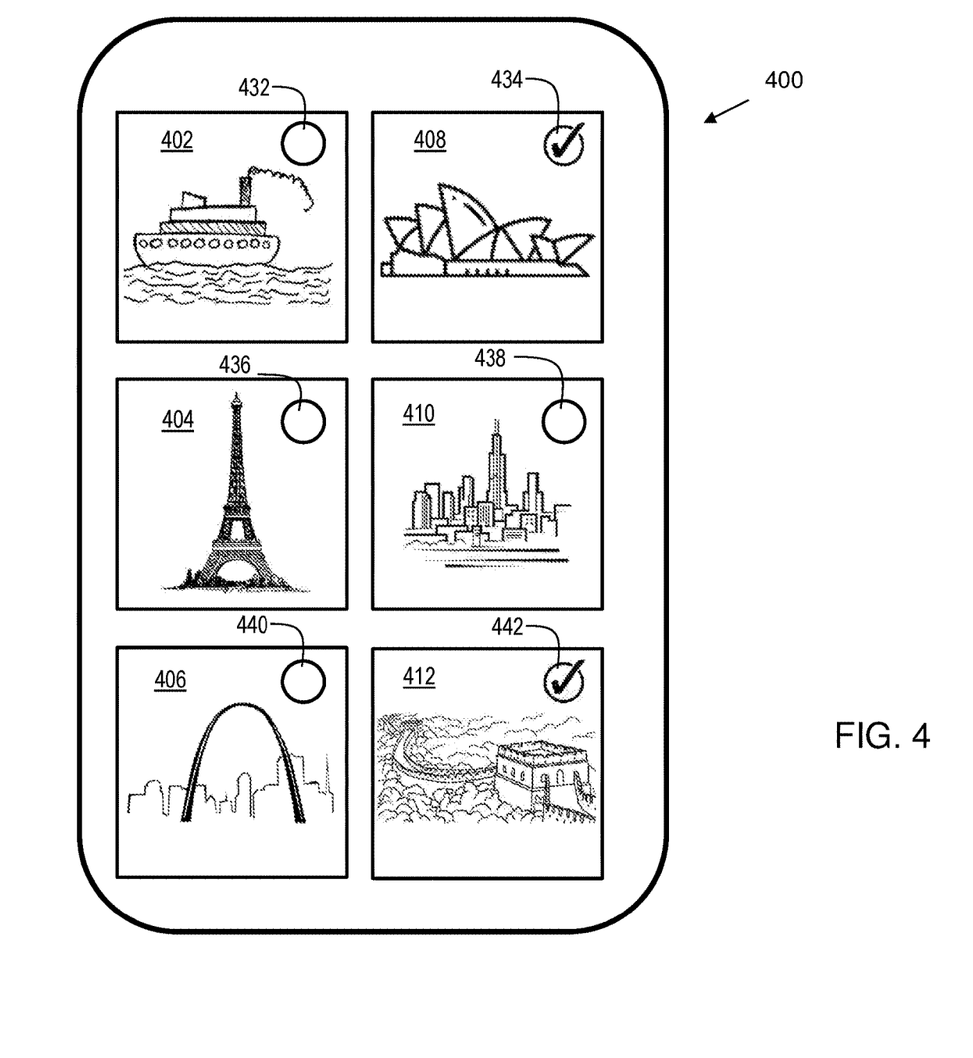
FIG. 4 shows an exemplary media selection interface in accordance with embodiments of the present invention.

FIG. 4 shows a display having an exemplary media selection interface 400 in accordance with embodiments of the present invention. Embodiments include rendering a media selection interface on the sender electronic device, and receiving a selection for one or more media items from the media selection interface. In the example, the sender electronic device presents six photos 402, 404, 406, 408, 410, and 412 on the display from which the user can choose to share. Buttons 432, 434, 436, 438, 440, and 442, each corresponding to a photo, may be selected by the user to choose which of the photos to share. In embodiments, there may be more or fewer than six items from which to choose. In embodiments, any media may be presented, such as photos, videos, text notes, music files, audio clips, etc. In the example of FIG. 4, photos 408 and 412 are selected as evidenced by the check marks in buttons 434 and 442.

Figure 5:
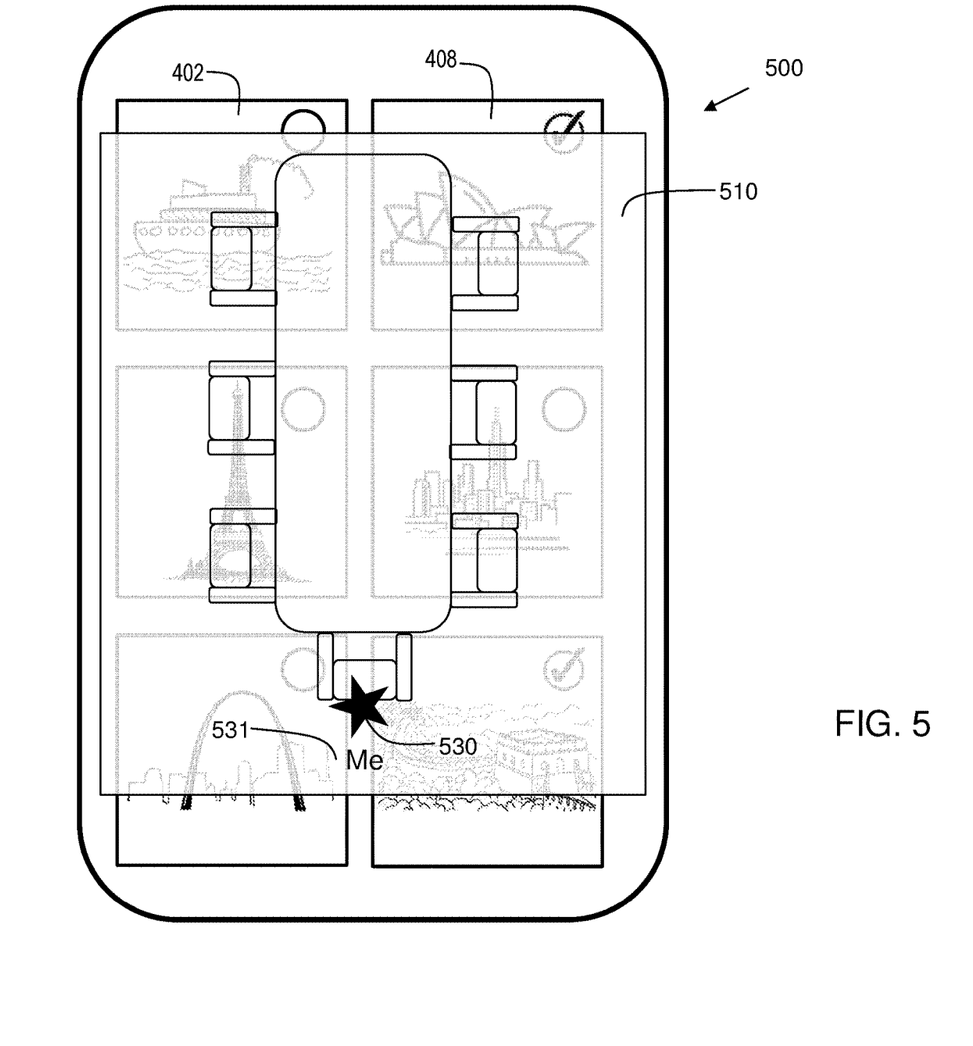
FIG. 5 shows an exemplary floor plan semi-transparently rendered over the media selection interface in accordance with embodiments of the present invention.

FIG. 5 shows a display 500 having an exemplary floor plan semi-transparently rendered over the media selection interface in accordance with embodiments of the present invention. Embodiments include rendering a floor plan view on the sender electronic device. In the example, floor plan 510, of the zone in which the user is located, is rendered over the media selection interface of FIG. 4. A graphical representation of the position of the user is shown at 530 (position indicator) with a text label 531. The floor plan 510 is semi-transparently rendered so that the media selection interface is still viewable "beneath" it. It should be recognized that in some embodiments, rather than translucency, another mechanism may be used to achieve the result of simultaneously showing the floor plan and media selection interface.

Figure 6:
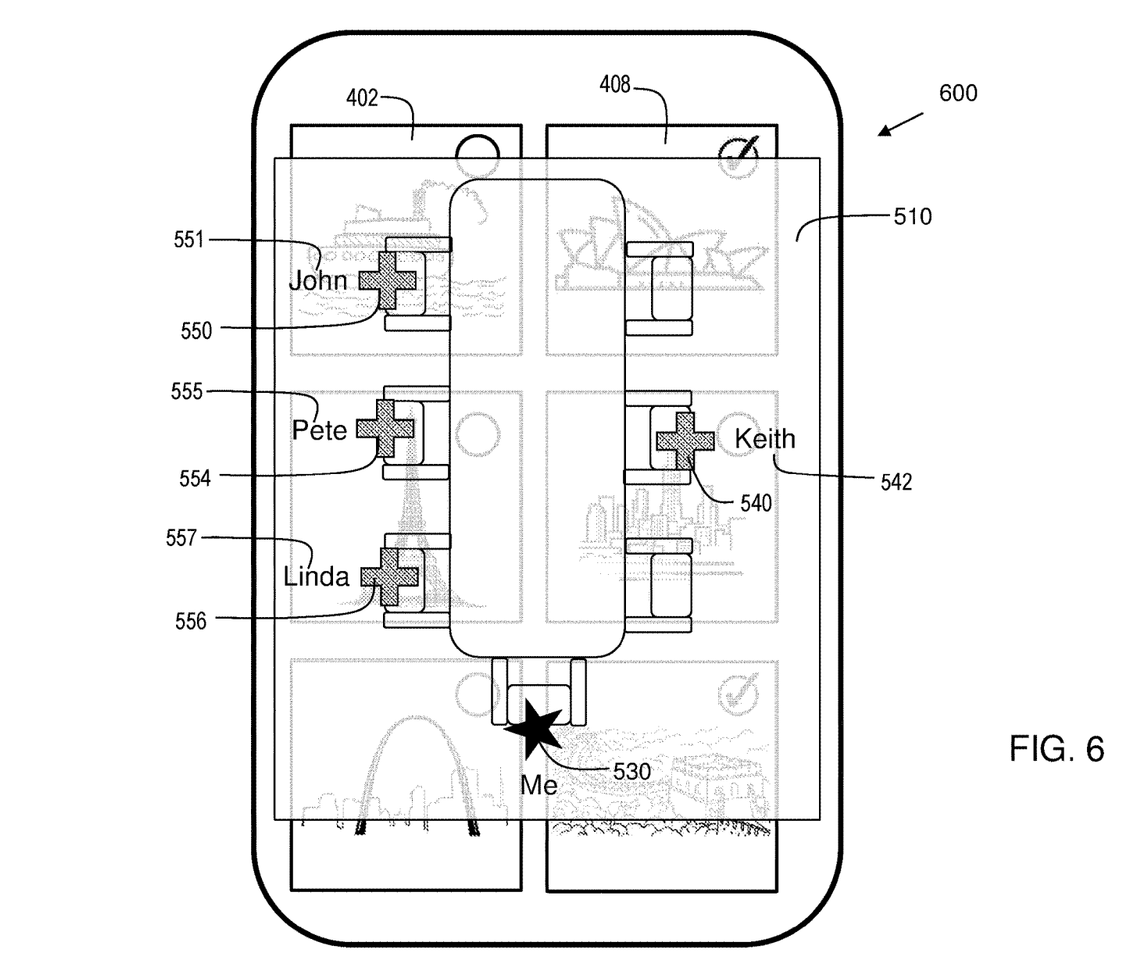
FIG. 6 shows an exemplary rendering of a text label corresponding to at least one of the plurality of potential recipient electronic devices.

FIG. 6 shows a display 600 having an exemplary rendering of a text label corresponding to at least one of the plurality of potential recipient electronic devices. Embodiments include rendering a graphical representation of the potential recipient electronic devices on the floor plan view. In some embodiments, rendering a graphical representation of the potential recipient electronic devices comprises rendering a text label and/or position indicator. Text labels are added to the floor plan to show where the potential recipient devices are located. For example, user Keith has a position indicator (i.e., a graphical label) 540 and associated text label 542. Similarly, user John has a position indicator 550 and associated text label 551, user Pete has a position indicator 554 and associated text label 555, and user Linda has a position indicator 556 and associated text label 557.

Figure 7:
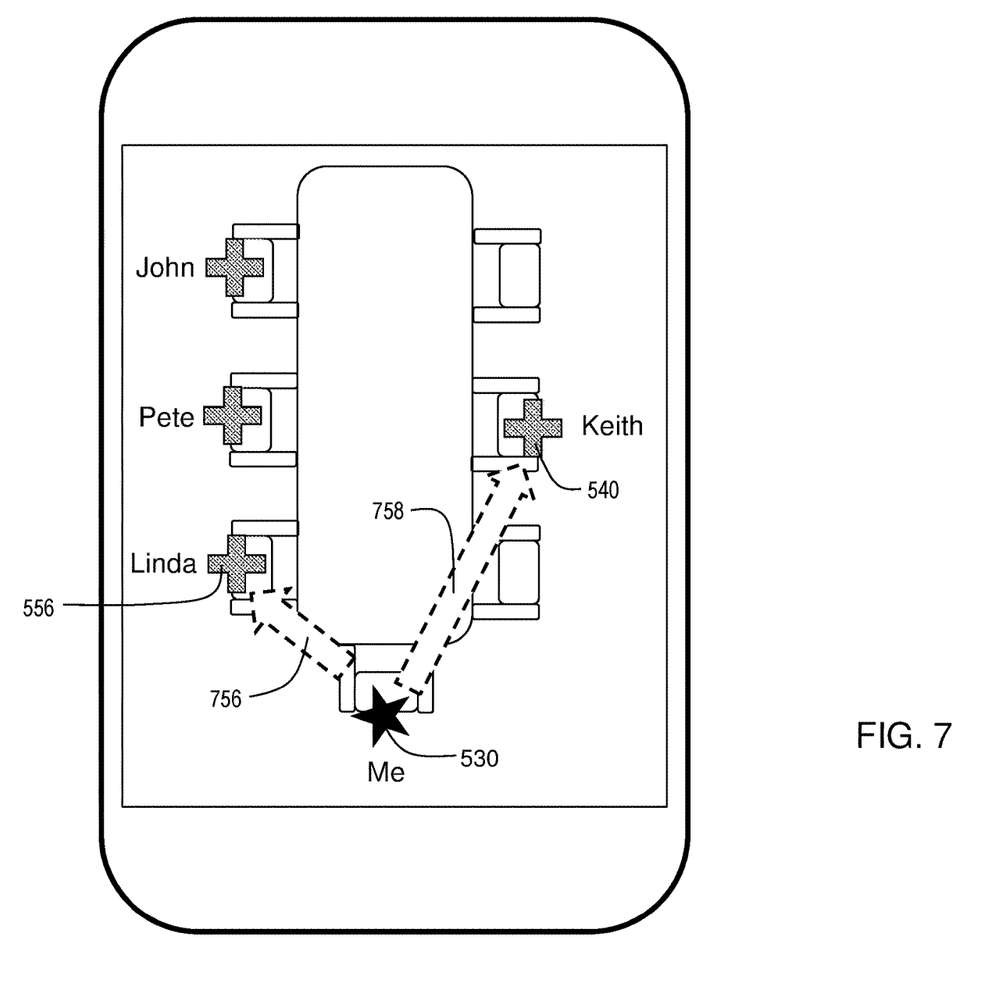
FIG. 7 shows an exemplary user interface action for sending media to multiple recipients.

FIG. 7 shows a display 700 having an exemplary user interface action for sending media to multiple recipients. Embodiments include sending the one or more media items to at least one potential recipient in response to receiving a user interface request action. In the example, a swipe motion across the display screen from the graphical representation (position indicator/graphical label or text label) of the user to a graphical representation of the recipient is the user interface action that initiates a share of the selected media with the recipient electronic device. Here, the user swipes with his/her finger across the screen of the phone on a path 756 from position indicator 530 to position indicator 556 (Linda). The user swipes again across the screen of the phone on a path 758 from position indicator 530 to position indicator 540 (Keith). It should be recognized that the swiping motion is an example of a user interface action, and that any suitable action by the user on the user interface can be included within embodiments to initiate a share of selected media.

Figure 8:
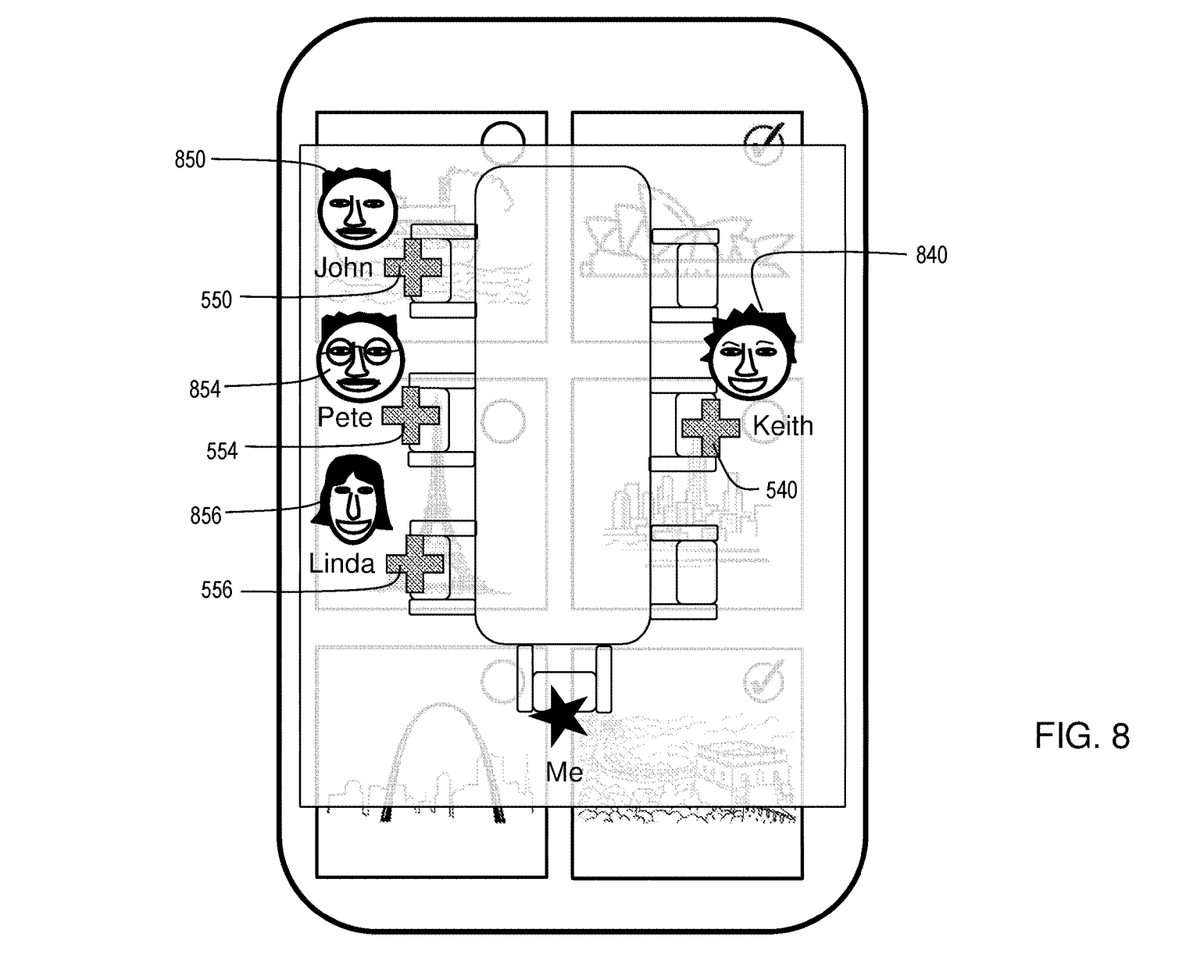
FIG. 8 shows an exemplary rendering of a photograph or avatar corresponding to at least one of the plurality of potential recipient electronic devices.

FIG. 8 shows a display 800 having an exemplary rendering of a graphical representation corresponding to at least one of the plurality of potential recipient electronic devices. In some embodiments, rendering a graphical representation of the potential recipient electronic devices comprises rendering an avatar or a photograph. In some embodiments, rather than, or in addition to, a text label, a photograph or avatar corresponding to the recipient electronic device is displayed on the floor plan. The photograph may be extracted from a social media website where the users of the recipient electronic devices have accounts, or may be provided by the users when setting up an account with the inventive system. Alternatively, an avatar of the user may be extracted from a computer system where the user is registered, or the user can create one when registering an account with the inventive system. In the example, image (i.e., photo or avatar) 850 of John is shown with position indicator 550. Image 854 of Pete is shown with position indicator 554. Image 856 of Linda is shown with position indicator 556. Image 840 of Keith is shown with position indicator 540.

Figure 9:
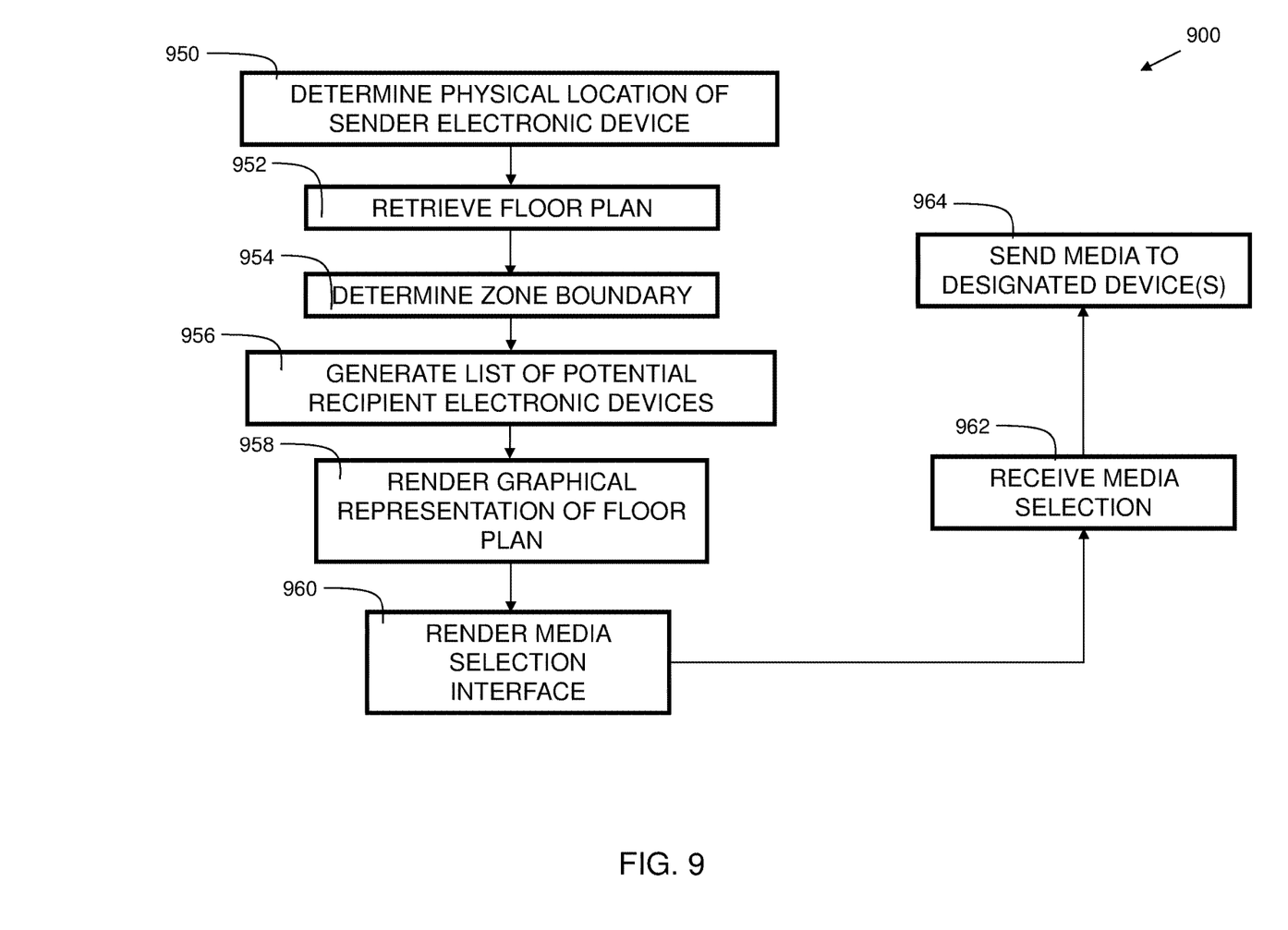
FIG. 9 is a flowchart indicating process steps for embodiments of the present invention.

FIG. 9 is a flowchart 900 indicating process steps for embodiments of the present invention. At 950, a physical location of a sender electronic device is determined. At 952, a floor plan, corresponding to the physical location of the sender electronic device, is retrieved. At 954, a zone boundary, corresponding to the physical location of the sender electronic device, is determined. At 956, a list of potential recipient electronic devices within the zone boundary is generated. At 958, a floor plan view is rendered on the sender electronic device. At 960, a graphical representation of the potential recipient electronic devices is rendered on the floor plan view. This is a media selection interface on the sender electronic device. At 962, a selection is received of one or more media items from the media selection interface. At 964, the one or more media items are sent to at least one potential recipient in response to receiving a user interface request action.

In some embodiments, the invention may be implemented as part of an augmented reality (AR) system. For example, the media selection interface could be overlaid onto a user interface, which includes glasses through which the user can see, as well as view computer generated display augmentations.

Embodiments of the present invention improve the technical field of electronic communication. Using techniques of disclosed embodiments, improved convenience of sending media from one electronic device to others in proximity is achieved, enabling information to be disseminated in a timely and efficient manner. This reduces the amount of user interaction required to send information, which has the benefits of reducing power consumption, memory usage, CPU usage etc. for the sending electronic device.

As can now be appreciated, disclosed embodiments provide techniques for sharing media. Floor plan data is retrieved based on a sender device physical location. The floor plan corresponding to the sender device physical location is identified. A plan boundary initializer creates zones based on predefined initialization criteria such as a room number or area location. Potential receiving devices within the zone are identified. A visual layout of the potential receiving devices is rendered on a floor plan view in a semi-transparent rendering over a media selection interface. This greatly simplifies the effort of sharing media with others in the same room. Another benefit of disclosed embodiments is that since it is zone specific, devices outside of the zone can be easily excluded, even if in radio range of the sender device.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for media sharing, comprising:

providing a first network to which a floorplan database connects;

determining a physical location of a sender electronic device, wherein the sender electronic device is connected to the first network;

retrieving, from the floorplan database, a floor plan corresponding to the physical location of the sender electronic device, wherein the floorplan includes furniture and walls;

determining a zone boundary corresponding to the physical location of the sender electronic device;

generating a list of potential recipient electronic devices within the zone boundary, wherein potential recipient electronic devices of the list of recipient electronic devices are connected to the first network;

establishing a second network, which is an ad hoc network via wifi triangulation, between the sender electronic device and each electronic device from the list of potential recipient electronic devices;

determining a position of at least one electronic device based on the established second network;

rendering a floor plan view on the sender electronic device;
rendering a graphical representation of the potential recipient electronic devices on the floor plan view;
rendering a media selection interface on the sender electronic device, wherein the media selection interface displays a plurality of media items selectable for sending to at least one potential recipient;
receiving a selection for at least media item of the plurality of media items from the media selection interface; and
sending the one or more media items to the at least one potential recipient electronic device in response to detecting a swipe motion on the floorplan view toward the at least one potential recipient electronic device.

2. The method of claim 1, wherein rendering a graphical representation of the potential recipient electronic devices comprises rendering a text label.

3. The method of claim 1, wherein rendering a graphical representation of the potential recipient electronic devices comprises rendering an avatar.

4. The method of claim 1, wherein rendering a graphical representation of the potential recipient electronic devices comprises rendering a photograph.

5. The method of claim 1, wherein generating a list of potential recipient electronic devices within the zone boundary comprises:
detecting presence of a plurality of recipient electronic devices via a received signal strength indication;
determining a position of each detected electronic device; and
including the detected electronic device in the list of potential recipient electronic devices if the position of the detected electronic device is deemed to be within the zone boundary.

6. The method of claim 1, further comprising, rendering the floor plan such that the floor plan is semi-transparently rendered over the media selection interface.

7. An electronic communication device comprising:
a processor;
a memory coupled to the processor, the memory containing instructions, that when executed by the processor, perform the steps of:
provide a first network to which a floorplan database connects;
determine a physical location of a sender electronic device, wherein the sender electronic device is connected to the first network;
retrieve, from the floorplan database, a floor plan corresponding to the physical location of the sender electronic device, wherein the floorplan includes furniture and walls;
determine a zone boundary corresponding to the physical location of the sender electronic device;
generate a list of potential recipient electronic devices within the zone boundary, wherein potential recipient electronic devices of the list of recipient electronic devices are connected to the first network;
establish a second network, which is an ad hoc network via wifi triangulation, between the sender electronic device and each electronic device from the list of potential recipient electronic devices;
determine a position of at least one electronic device based on the established second network;
render a floor plan view on the sender electronic device;

render a graphical representation of the potential recipient electronic devices on the floor plan view;
render a media selection interface on the sender electronic device, wherein the media selection interface displays a plurality of media items selectable for sending to at least one potential recipient;
receive a selection for at least media item of the plurality of media items from the media selection interface; and
send the one or more media items to the at least one potential recipient electronic device in response to detecting a swipe motion on the floorplan view toward the at least one potential recipient electronic device.

8. The device of claim 7, wherein the memory further comprises instructions, that when executed by the processor, perform the step of rendering a text label corresponding to at least one of the plurality of potential recipient electronic devices.

9. The device of claim 7, wherein the memory further comprises instructions, that when executed by the processor, perform the step of rendering an avatar corresponding to at least one of the plurality of potential recipient electronic devices.

10. The device of claim 7, wherein the memory further comprises instructions, that when executed by the processor, perform the step of rendering a photograph corresponding to at least one of the plurality of potential recipient electronic devices.

11. The device of claim 7, wherein the memory further comprises instructions, that when executed by the processor, perform the steps of:
detecting presence of a plurality of recipient electronic devices via a received signal strength indication;
determining a position of each detected electronic device; and
including the detected electronic device in the list of potential recipient electronic devices if the position of the detected electronic device is deemed to be within the zone boundary.

12. The device of claim 7, wherein the memory further comprises instructions, that when executed by the processor, perform the step of rendering the floor plan such that the floor plan is semi-transparently rendered over the media selection interface.

13. A computer program product for media sharing, for an electronic computing device comprising a computer readable storage medium having program instructions embodied therewith, the program instructions executable by a processor to cause the electronic computing device to:
provide a first network to which a floorplan database connects;
determine a physical location of a sender electronic device, wherein the sender electronic device is connected to the first network;
retrieve, from the floorplan database, a floor plan corresponding to the physical location of the sender electronic device, wherein the floorplan includes furniture and walls;
determine a zone boundary corresponding to the physical location of the sender electronic device;
generate a list of potential recipient electronic devices within the zone boundary, wherein potential recipient electronic devices of the list of recipient electronic devices are connected to the first network;
establish a second network, which is an ad hoc network via wifi triangulation, between the sender electronic device and each electronic device from the list of potential recipient electronic devices;

determine a position of at least one electronic device based on the established second network;

render a floor plan view on the sender electronic device;

render a graphical representation of the potential recipient electronic devices on the floor plan view;

render a media selection interface on the sender electronic device, wherein the media selection interface displays a plurality of media items selectable for sending to at least one potential recipient;

receive a selection for at least media item of the plurality of media items from the media selection interface; and send the one or more media items to the at least one potential recipient electronic device in response to detecting a swipe motion on the floorplan view toward the at least one potential recipient electronic device.

14. The computer program product of claim 13, further comprising program instructions executable by a processor to cause the electronic computing device to render a text label corresponding to at least one of the plurality of potential recipient electronic devices.

15. The computer program product of claim 13, further comprising program instructions executable by a processor to cause the electronic computing device to render an avatar corresponding to at least one of the plurality of potential recipient electronic devices.

16. The computer program product of claim 13, further comprising program instructions executable by a processor to cause the electronic computing device to render a photograph corresponding to at least one of the plurality of potential recipient electronic devices.

17. The computer program product of claim 13, further comprising program instructions executable by a processor to cause the electronic computing device to render the floor plan such that the floor plan is semi-transparently rendered over the media selection interface.

* * * * *